USO10766616B2

United States Patent
Hieida et al.

(10) Patent No.: US 10,766,616 B2
(45) Date of Patent: Sep. 8, 2020

(54) ENVIRONMENT MAP AUTOMATIC CREATION DEVICE

(71) Applicant: HITACHI, LTD., Tokyo (JP)

(72) Inventors: Yusuke Hieida, Tokyo (JP); Takuya Naka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 353 days.

(21) Appl. No.: 15/746,931

(22) PCT Filed: Jul. 22, 2016

(86) PCT No.: PCT/JP2016/071475
§ 371 (c)(1),
(2) Date: Jan. 23, 2018

(87) PCT Pub. No.: WO2017/038291
PCT Pub. Date: Mar. 9, 2017

(65) Prior Publication Data
US 2020/0079504 A1 Mar. 12, 2020

(30) Foreign Application Priority Data

Aug. 31, 2015 (JP) .................................. 2015-169983

(51) Int. Cl.
*B64C 29/02* (2006.01)
*B64C 39/02* (2006.01)
(Continued)

(52) U.S. Cl.
CPC ............ *B64C 39/024* (2013.01); *B64D 47/08* (2013.01); *G01C 21/005* (2013.01); *B64C 2201/123* (2013.01); *B64C 2201/127* (2013.01)

(58) Field of Classification Search
CPC .................... B64C 2201/123; B64C 2201/127
See application file for complete search history.

(56) References Cited

U.S. PATENT DOCUMENTS 9,208,601 B2 * 12/2015 Pirwani ................... G06T 15/00
2004/0027344 A1 2/2004 Ohto
(Continued)

FOREIGN PATENT DOCUMENTS

JP 2003-287422 A 10/2003
JP 2014-139538 A 7/2014
JP 2014-145784 A 8/2014

OTHER PUBLICATIONS

"Using color profiles for street detection in low-altitude UAV video" Proc. SPIE 7307, Airborne Intelligence, Surveillance, Reconnaissance (ISR) Systems and Applications VI, 730700 (Apr. 28, 2009) to Candamo et al. (Year: 2009).*

(Continued)

*Primary Examiner* — Kenneth J Malkowski
(74) *Attorney, Agent, or Firm* — Mattingly & Malur, PC

(57) ABSTRACT

Provided is an environment map automatic creation device using a flying object. The environment map automatic creation device includes a travelable area extraction unit that extracts a travelable area where a vehicle can travel in a certain area based on three-dimensional shape information of an area for creating an environmental map, which is acquired by a sensor in a flying object, an area category determination unit that determines a category of the travelable area, a complementary portion determination unit that determines whether or not to measure a complementary portion which complements the travelable area based on the travelable area and the category, and a complementary measurement portion presentation unit that presents the complementary measurement portion.

7 Claims, 12 Drawing Sheets

(51) Int. Cl.
*B64D 47/08* (2006.01)
*G01C 21/00* (2006.01)

(56) References Cited

U.S. PATENT DOCUMENTS

2013/0332063 A1* 12/2013 Pirwani .................. G01C 21/32
701/409
2016/0371984 A1* 12/2016 Macfarlane ............ G01C 21/20

OTHER PUBLICATIONS

International Search Report of PCT/JP2016/071475 dated Oct. 11, 2016.

* cited by examiner

[Fig. 1]
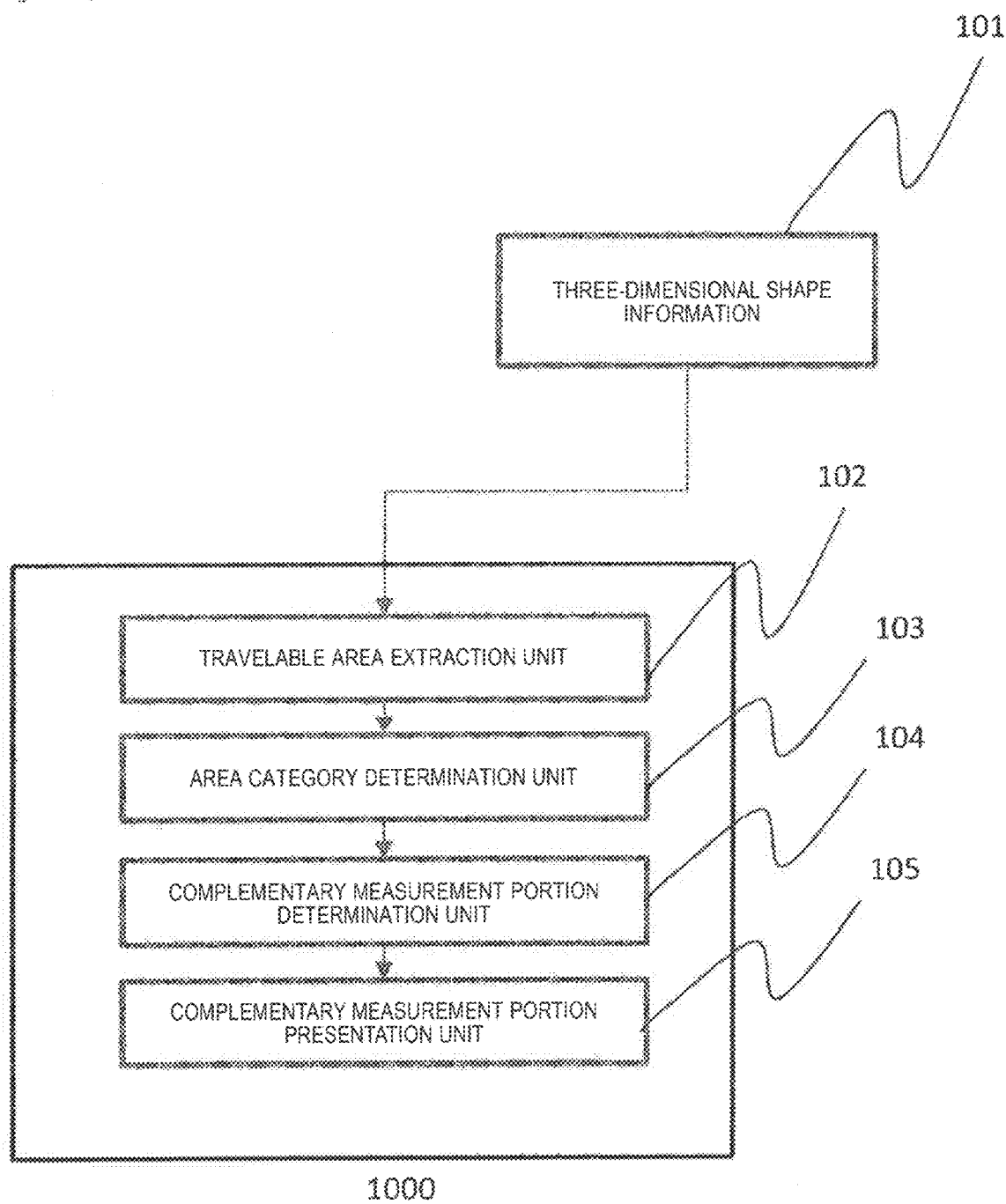

[Fig. 2]
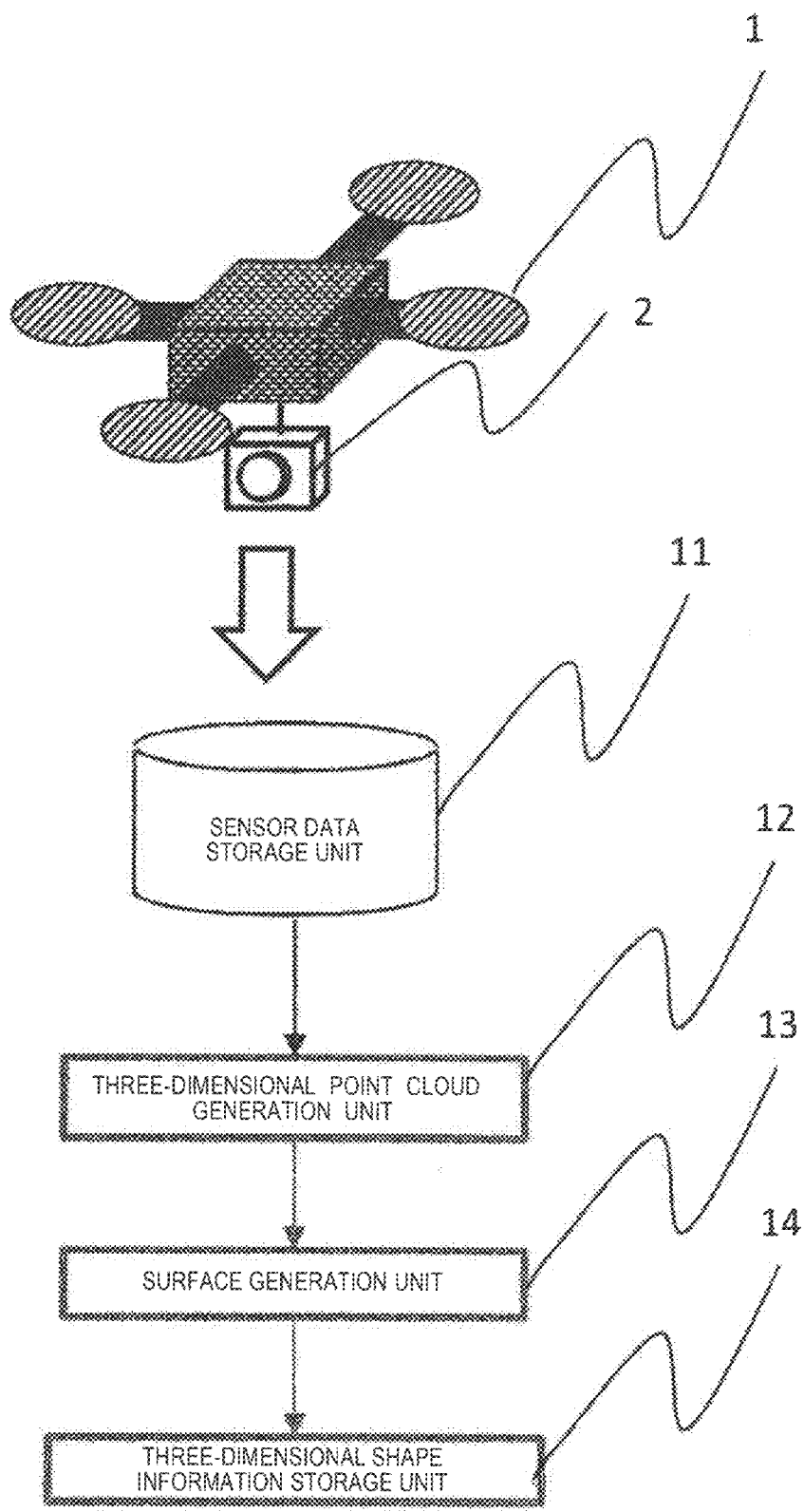

[Fig. 3]
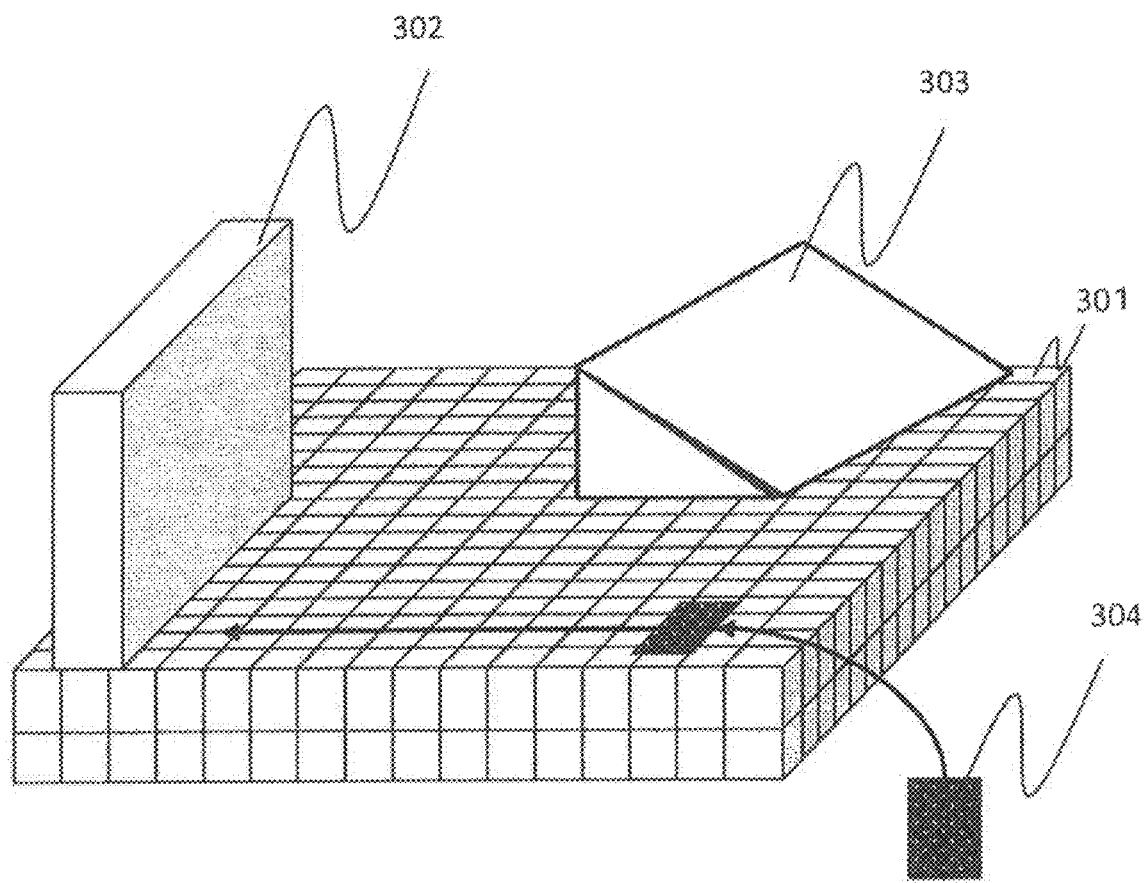

[Fig. 4]
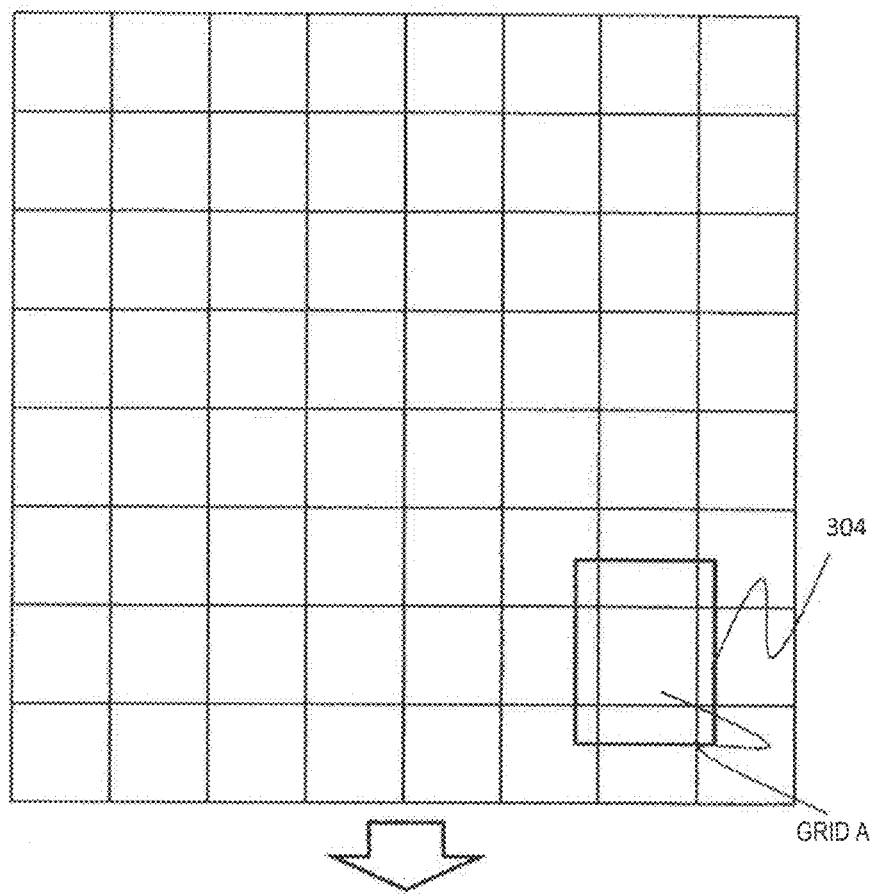
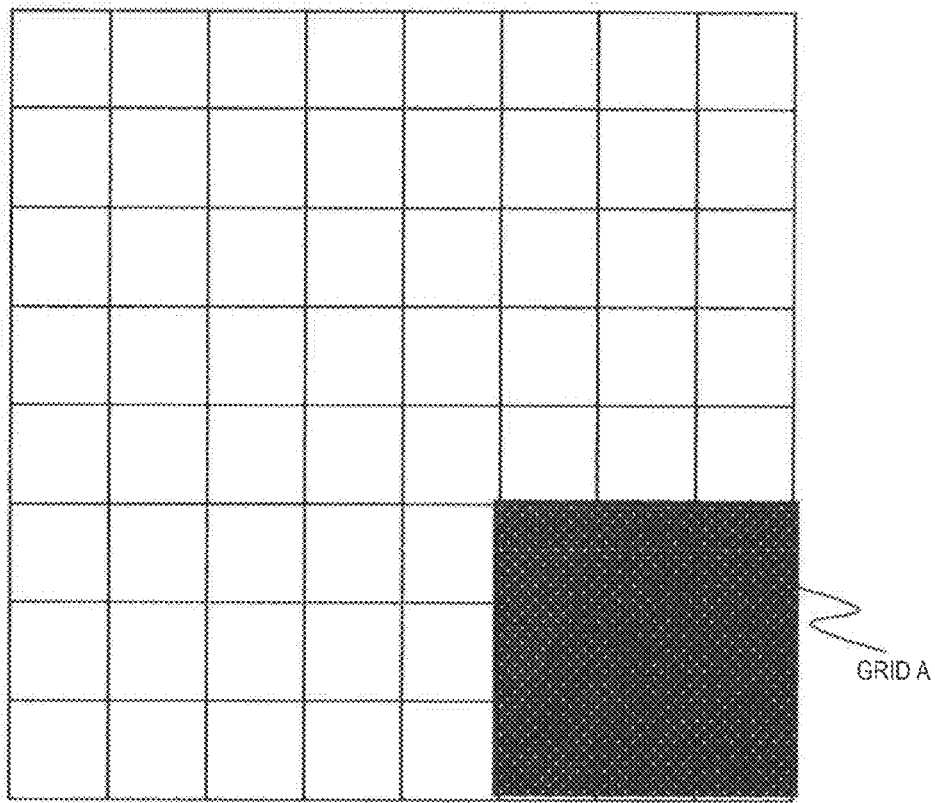

[Fig. 5]
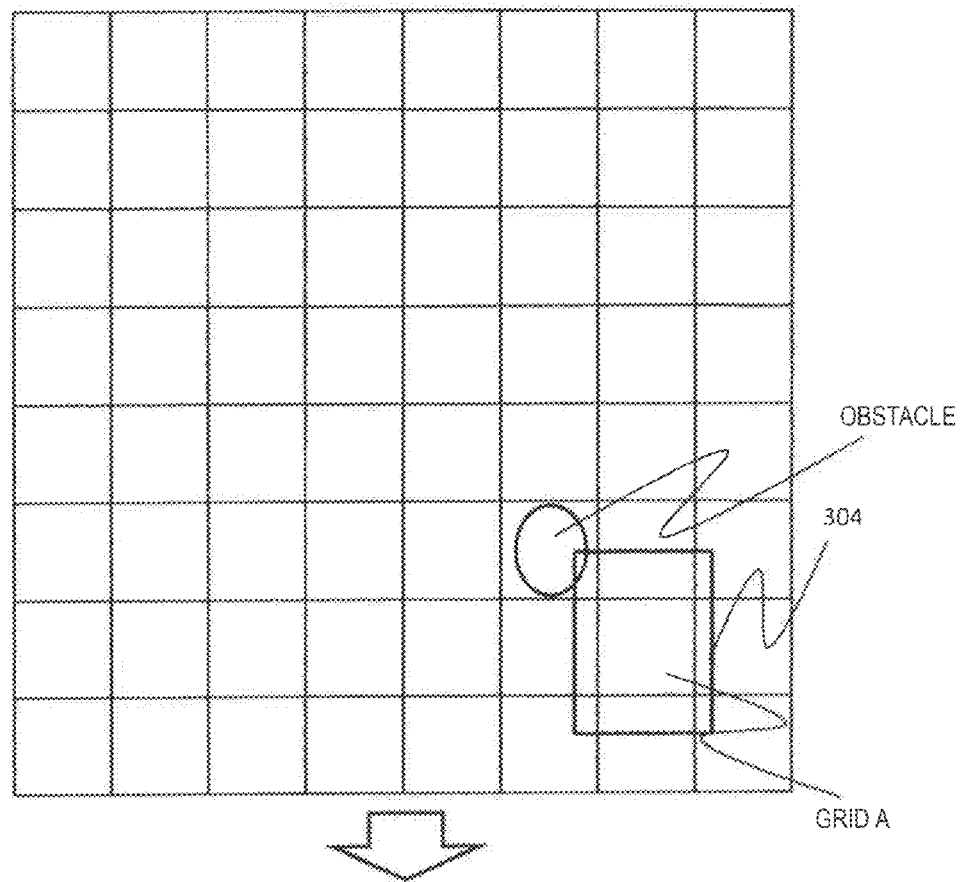
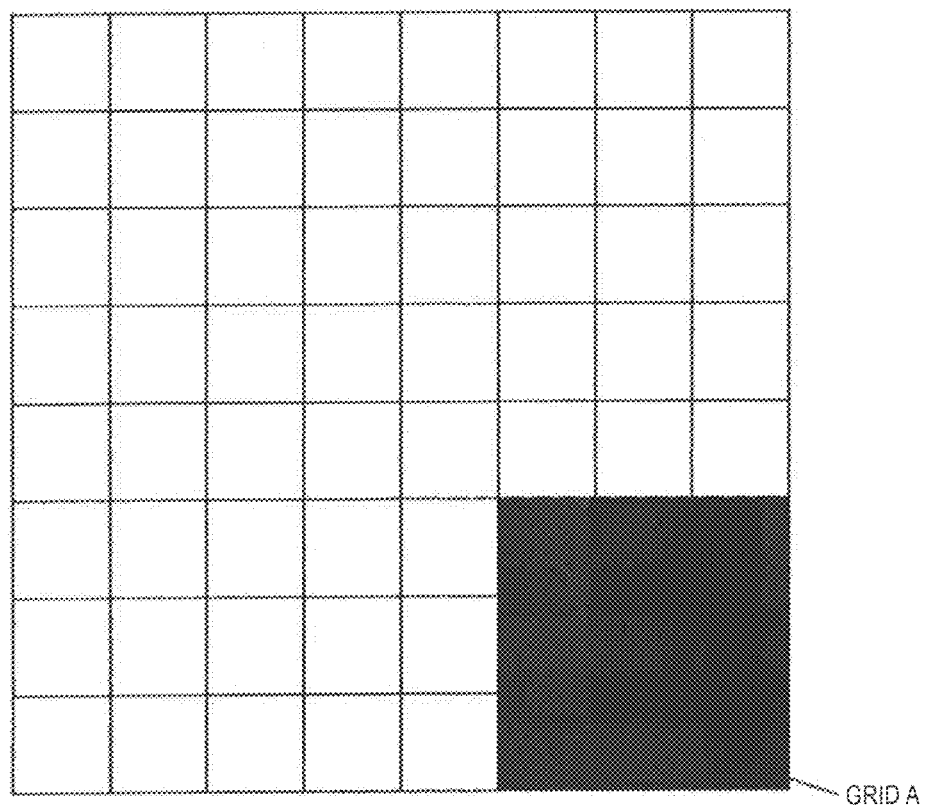

[Fig. 6]
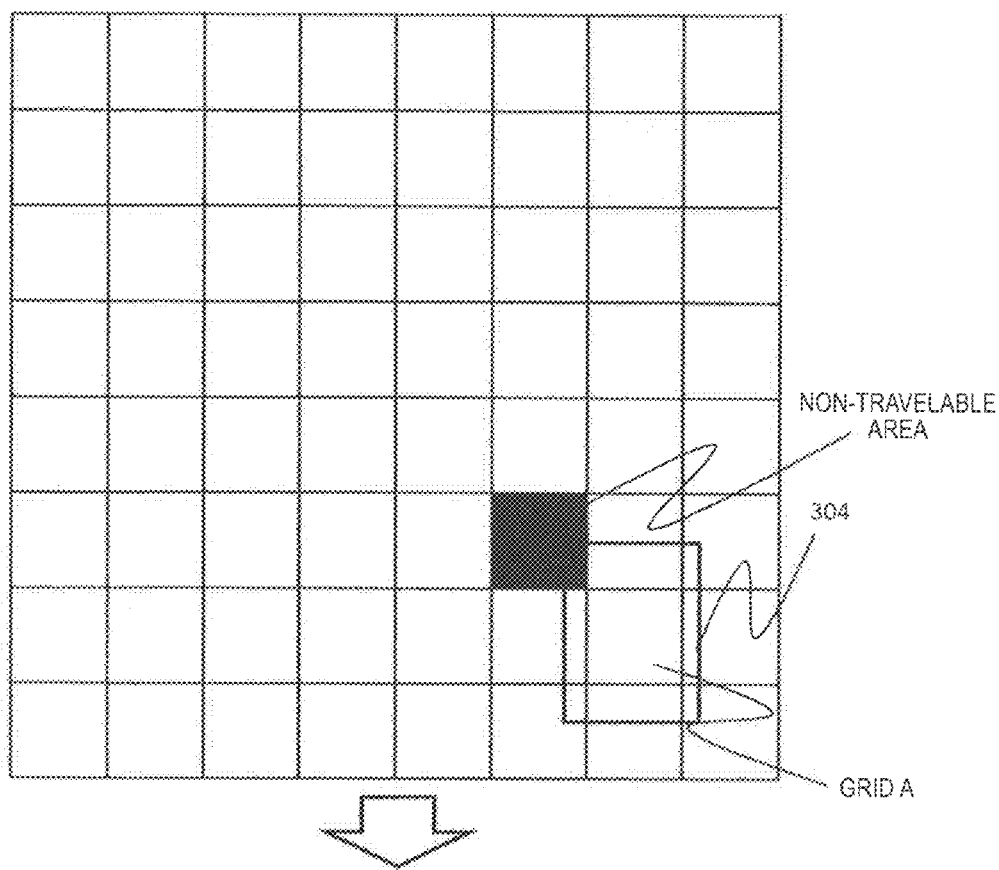
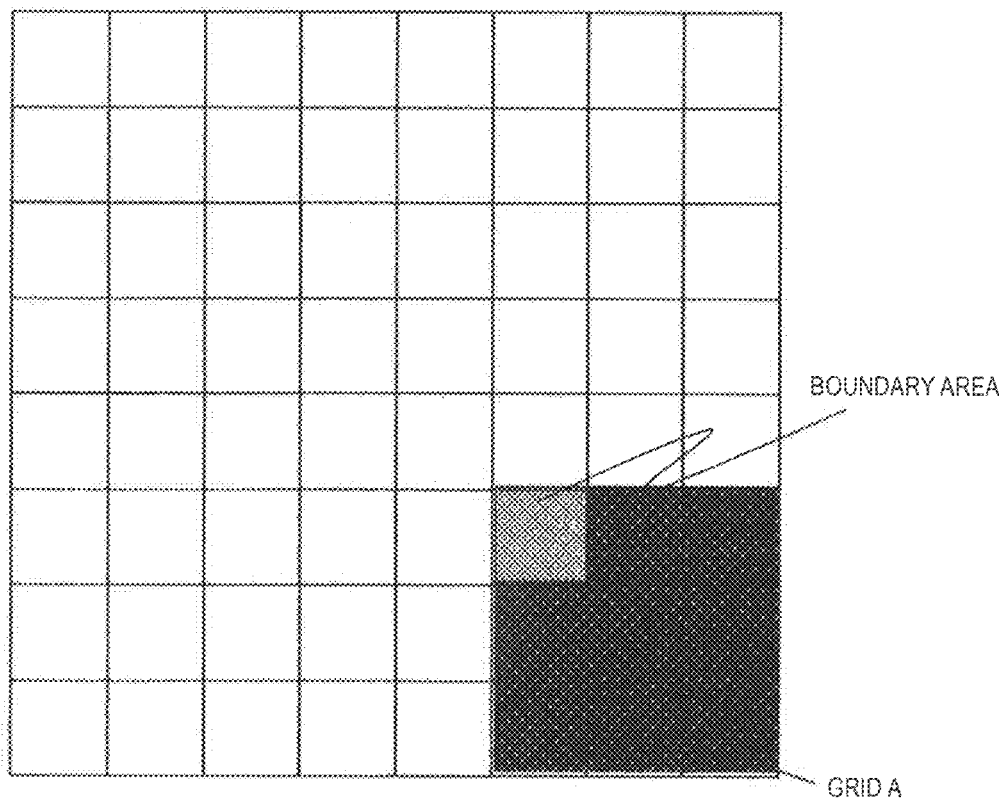

[Fig. 7]
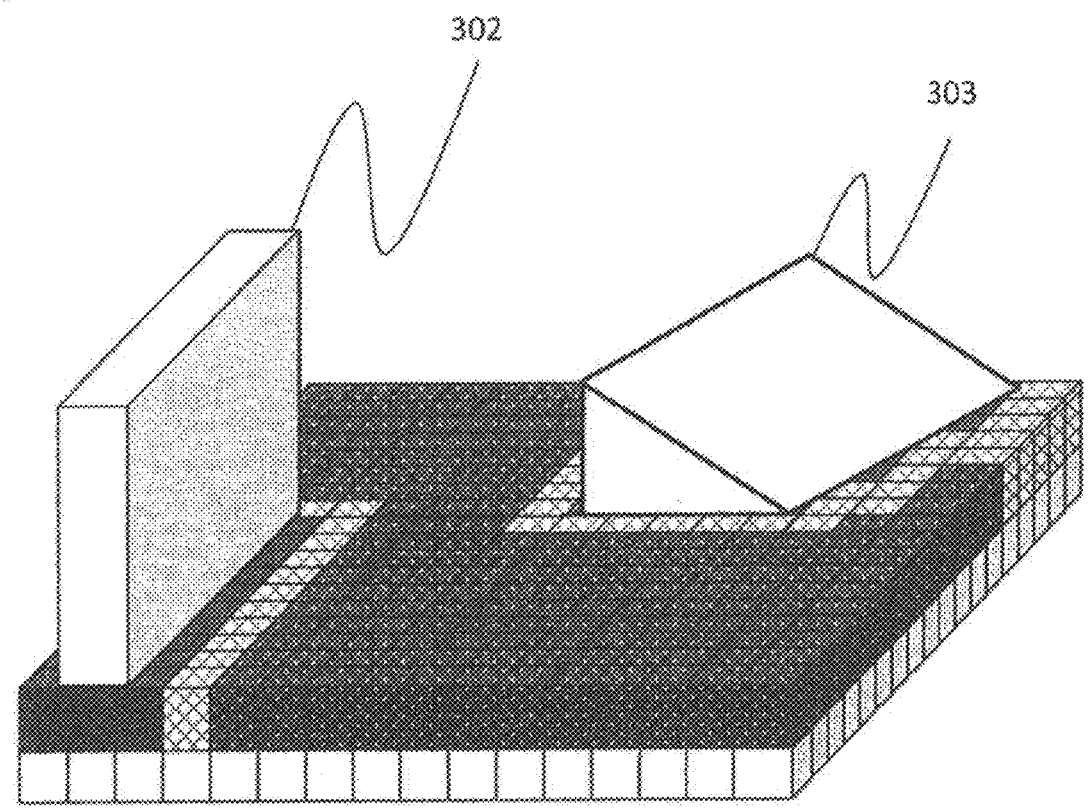

[Fig. 8]
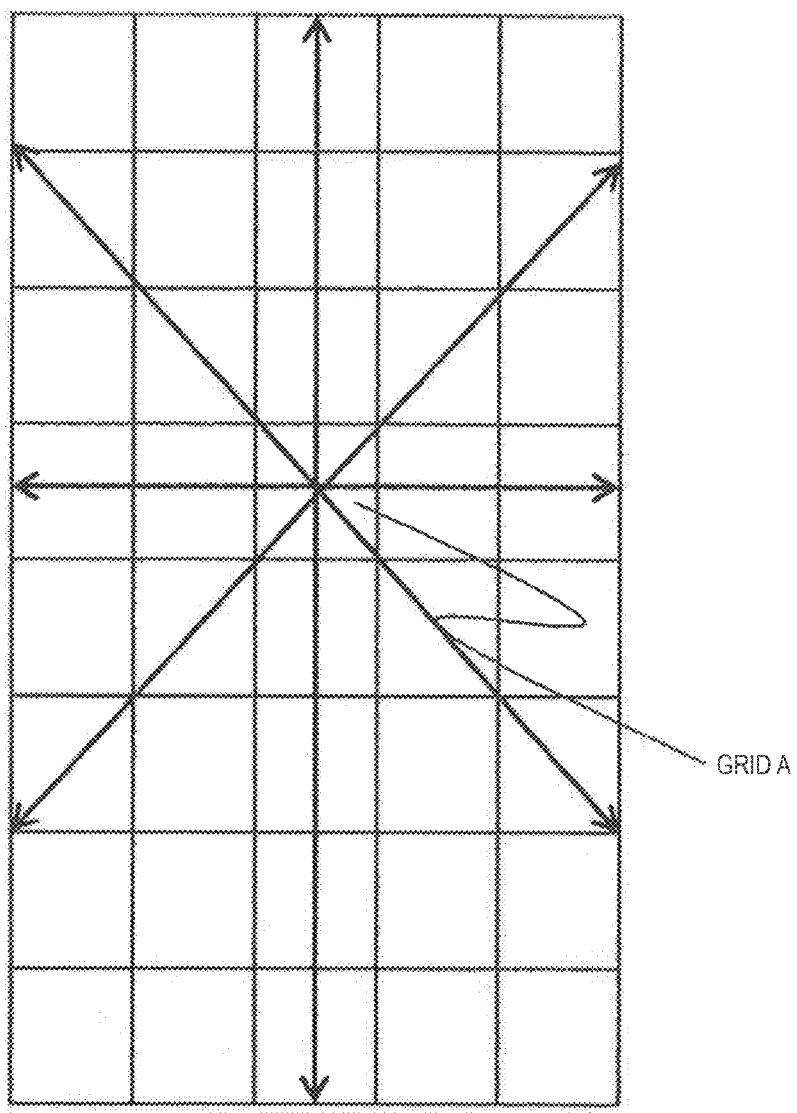

[Fig. 9]
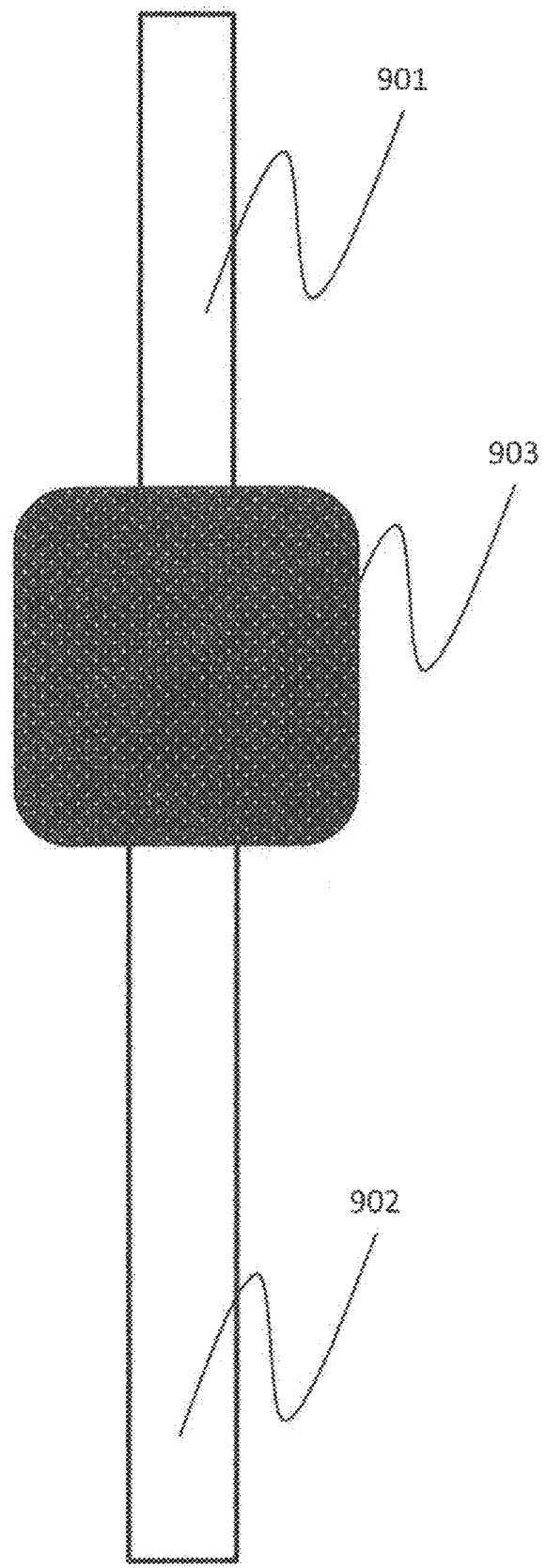

[Fig. 10]
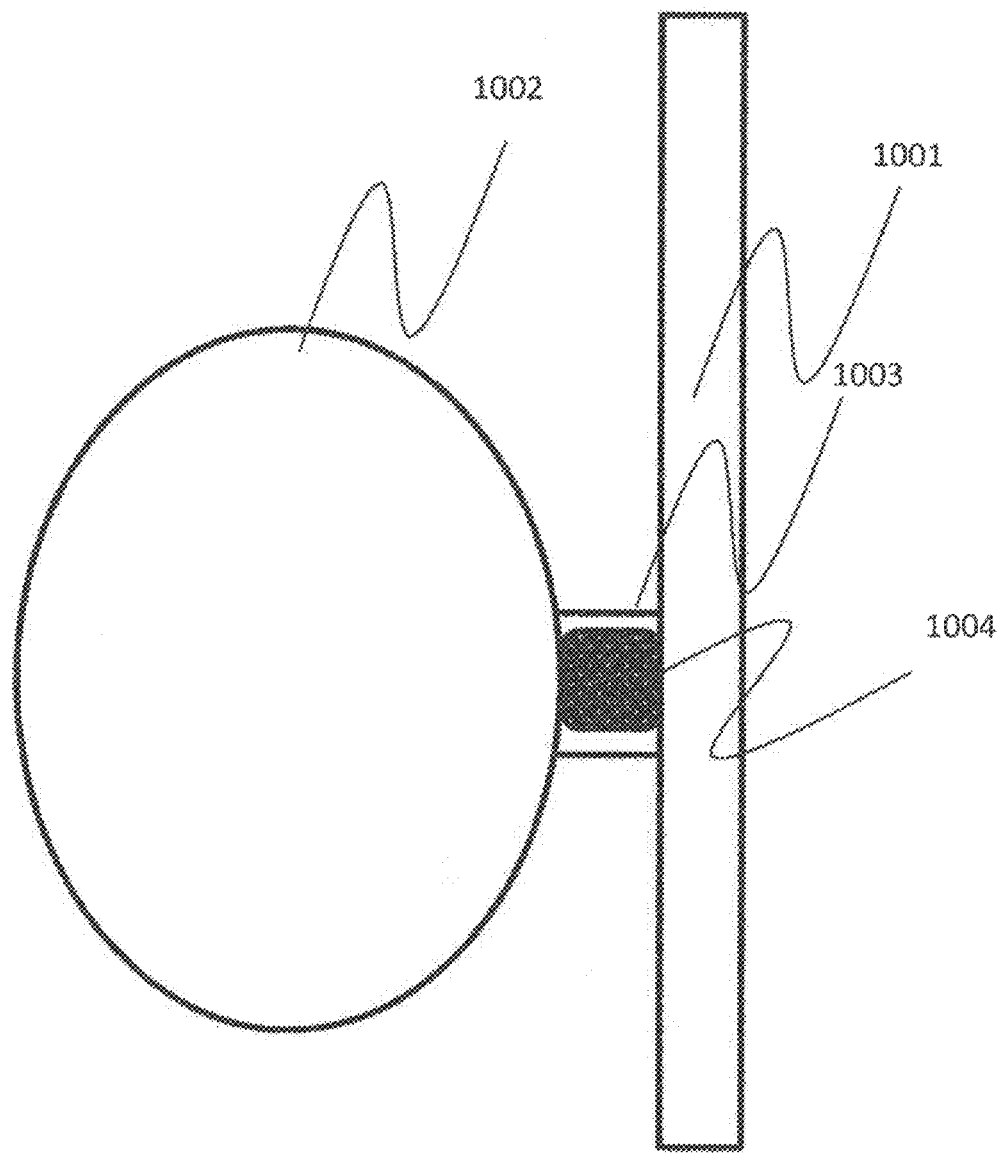

[Fig. 11]
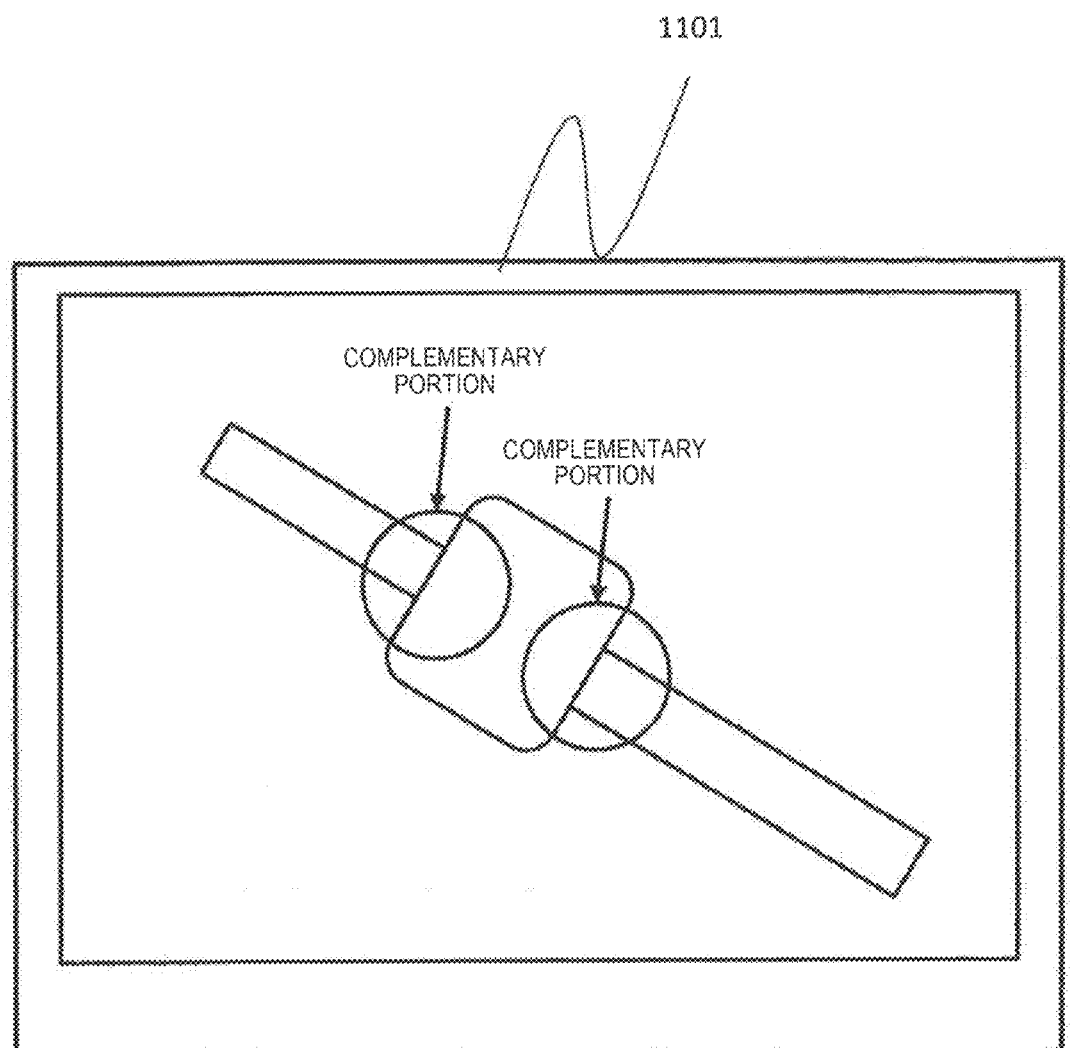

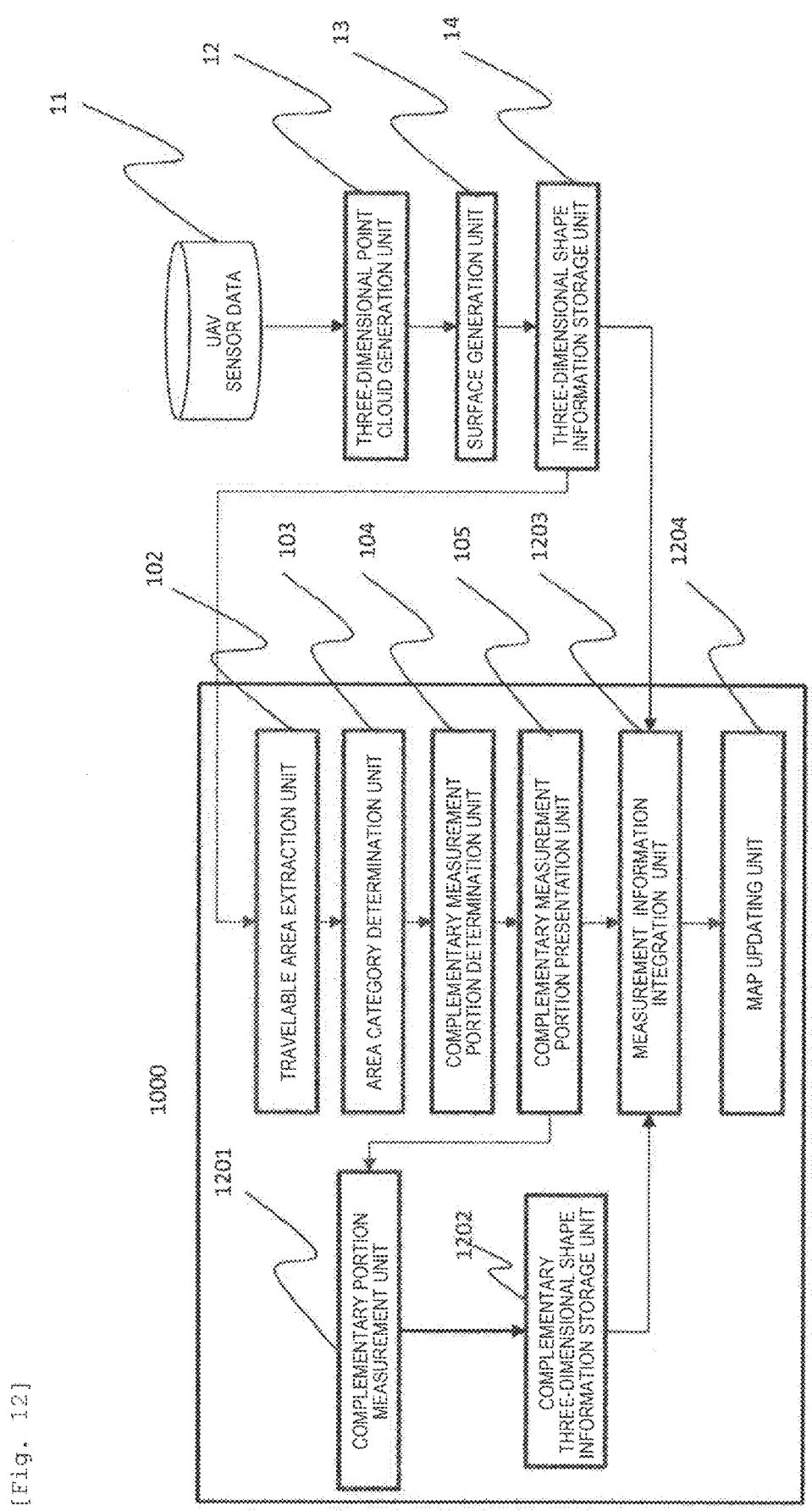
[Fig. 12]

ENVIRONMENT MAP AUTOMATIC CREATION DEVICE

TECHNICAL FIELD

The present invention relates to an environment automatic map creation device using an unmanned aerial vehicle or the like.

BACKGROUND ART

In an autonomous traveling system in a vehicle and a mining dump truck, traveling control of the vehicle is performed so that the vehicle can autonomously travel based on vehicle position information from a positioning device such as a GPS mounted on these autonomous traveling vehicle.

In a case of causing the vehicle to perform autonomous traveling, it is necessary to create an environmental map having route information, a travelable area and obstacle information of the environment. As the method, for example, there is a method of measuring the environment and creating the environmental map for the autonomous traveling vehicle by using a manned measuring vehicle equipped with a GPS, an inertial sensor, a camera, and LIDAR, and traveling a course on which the autonomous traveling vehicle travels in advance. In addition, another method is to measure the environment with an unmanned aerial vehicle (UAV) equipped with a GPS, an inertial sensor, a camera, a laser distance measuring sensor (light detection and ranging: LIDAR), and the like, and to create a map based on the information.

However, in the case of the former method, there is a possibility that the environment cannot be sufficiently measured due to measurement performance of the measuring vehicle and occlusion caused by an environmental obstacle and the like. For example, as a technique for solving the problem, PTL 1 discloses "a terrain information acquisition device that includes an area specifying unit which specifies a completed area where a three-dimensional map is created and an uncompleted area where a three-dimensional map is not created of the predetermined area with reference to a three-dimensional map created in advance for a portion of the terrain in a predetermined area, a terrain gradient estimation unit which estimates a terrain gradient in the uncompleted area based on the three dimensional map, and a terrain data acquisition unit which acquires terrain data in the uncompleted area while optimizing the terrain data acquisition condition based on the uncompleted area and the terrain gradient estimated in the uncompleted area".

CITATION LIST

Patent Literature

PTL 1: JP-A-2014-139538

SUMMARY OF INVENTION

Technical Problem

However, PTL 1 determines a completed area where an acquired data is sufficient and an uncompleted area where the acquired data is insufficient by a presence and absence of height information of three-dimensional measurement data, so that an unmeasured area detected by this method is significantly limited. For example, in PTL 1, in a case where the three-dimensional map created in advance for a portion of a terrain in the predetermined area is created by an aerial photograph captured with a UAV, since the measured information has height information, so that a portion hidden by a tunnel or trees is determined to be a complete area in PTL 1, but in fact since traveling route information cannot be measured, the portion hidden by the tunnel or trees is not yet measured. Therefore, the three-dimensional map disclosed in PTL 1 is effective in a case where the map is created using a measuring vehicle, but the map cannot sufficiently operate in a case where the map is created using UAV.

In addition, a task of acquiring map data using the measuring vehicle takes time and cost for measurement than a method of acquiring data using the UAV in many cases, so that it is desirable to create an environmental map by using a lot of data acquired by the UAV as much as possible. In addition, by using the UAV, it is possible to respond promptly in a case where there is a change in environmental information terrain and route information.

The present invention has been made in view of the above problems, and it is an object thereof to provide an environment map automatic creation device using a flying object such as UAV.

Solution to Problem

An aspect of the present invention for solving the above problem is as follows, for example.

The environment map automatic creation device includes a travelable area extraction unit that extracts a travelable area where a vehicle can travel in a certain area based on three-dimensional shape information of an area for creating an environmental map, which is acquired by a sensor in a flying object, an area category determination unit that determines a category of the travelable area, a complementary portion determination unit that determines whether or not to measure a complementary portion which complements the travelable area based on the travelable area and the category, and a complementary measurement portion presentation unit that presents the complementary measurement portion.

ADVANTAGEOUS EFFECTS OF INVENTION

According to the present invention, it is possible to provide the environment map automatic creation device using the flying object. The problems, configurations, and effects other than those described above will be clarified by the description of the embodiments below.

BRIEF DESCRIPTION OF DRAWINGS

FIG. 1 is a schematic diagram illustrating a configuration according to Example 1.

FIG. 2 is a diagram illustrating a configuration of a three-dimensional shape acquisition method.

FIG. 3 is a diagram illustrating an example of a principle of extracting a travelable area.

FIG. 4 is a diagram illustrating an example of the principle of extracting the travelable area.

FIG. 5 is a diagram illustrating an example of the principle of extracting the travelable area.

FIG. 6 is a diagram illustrating an example of the principle of extracting the travelable area.

FIG. 7 is a diagram illustrating an example of the principle of extracting the travelable area.

FIG. 8 is a diagram illustrating an example of area category determination.

FIG. 9 is an example of a portion where route information is insufficient due to interruption of a tunnel or trees.

FIG. 10 is an example of a portion where route information is insufficient due to a temporary stop of a vehicle or a gate which opens and closes.

FIG. 11 is a diagram illustrating an example of a complementary portion presentation unit.

FIG. 12 is a schematic diagram illustrating a configuration according to Example 2.

DESCRIPTION OF EMBODIMENTS

Hereinafter, embodiments of the present invention will be described with reference to the drawings. The following description illustrates specific examples of the contents of the present invention, and the present invention is not limited to these descriptions. Various changes and modifications by those skilled in the art are possible within the scope of the technical idea disclosed in this specification. In addition, in all the drawings for describing the present invention, those having the same function will be denoted by the same reference numerals, and the repetitive description thereof may be omitted.

Example 1

In creating an environmental map that can be used by an autonomous traveling vehicle or the like, this embodiment is an embodiment in which a complementary measurement portion serving as a portion where there is a possibility that information is insufficient to a user is presented.

FIG. 1 is a schematic diagram illustrating a configuration according to this Example. An environment map automatic creation device 1000 is provided with a travelable area extraction unit 102 that extracts a travelable area in which a vehicle can travel in an arbitrary area, an area category determination unit 103 that determines a category of a travelable area, a complementary portion determination unit 104 that determines whether or not to measure a complementary portion that complements the travelable area, and a complementary portion presentation unit 105 that presents a complementary measurement portion, based on three-dimensional shape information of an area for creating an environmental map acquired by a sensor in a flying object.

The three-dimensional shape information 101 of the area for creating the environmental map is acquired, and supplied to the travelable area extraction unit 102 for determining whether or not a certain vehicle can travel from the three-dimensional shape information. At this time, the three-dimensional shape information is obtained by attaching and measuring a camera, a laser distance measuring sensor (LIDAR), millimeter wave radar, ultrasonic sensor, and a sensor similar thereto, which can acquire the shape of the environment or brightness, color information, and temperature information of the environment, to the flying objects such as unmanned aerial vehicle, manned aircraft, and artificial satellite.

FIG. 2 illustrates a configuration of a three-dimensional shape acquisition method using a device in which a monocular camera is attached to a UAV. At this time, a monocular camera 2 can be an infrared camera or a far infrared camera in addition to a camera capable of measuring visible light.

In this configuration, first, the monocular camera 2 is attached to a UAV 1, and the UAV 1 is flew over a portion where the environmental map is to be created. At this time, continuous shooting is performed with the monocular camera 2. At this time, it is considered that it is desirable to capture images so that the front and rear of the captured image is approximately 80% and the side of the captured image is approximately 60% overlapped with the other captured images.

The captured image group is stored in a sensor data storage unit 11. Using this image group, a three-dimensional point cloud generation unit 12 can obtain three-dimensional point cloud information of the environment by using Structure from Motion (SfM) and Multi View Stereo (MVS).

Based on the three-dimensional point cloud information, a surface generation unit 13 meshes the three-dimensional point cloud information to generate three-dimensional surface information having texture information and surface normal vector information. This three-dimensional point group information and the three-dimensional surface information are referred to as three-dimensional shape information here.

The three-dimensional shape information is stored in a three-dimensional shape information storage unit 14. Since these techniques are well-known techniques, these techniques are omitted here. Subsequently, the travelable area is extracted from the three-dimensional shape information using the travelable area extraction unit 102.

FIG. 3 illustrates an example of extracting a travelable area of a certain vehicle serving as an example of a principle of extracting the travelable area. Since areas expressed by grids are a road surface area 301, and an obstacle 302 and an obstacle 303 cannot travel the vehicle, the areas are not a travelable road surface.

First, the three-dimensional space is divided into two-dimensional grids viewed from a bird's eye view direction. At this time, the size of the grid to be divided is set to be sufficiently smaller size than the accuracy of the boundary to be obtained.

Subsequently, a plane having the same size as when viewing the vehicle to examined for the travelable area in the bird's-eye view direction is assumed. At this time, the plane is set to be a virtual vehicle 304.

Next, a grid of the divided grids is selected. The grid is set to be grid A. Assuming that the virtual vehicle 304 is at a center position of the two-dimensional coordinates of the grid, the virtual vehicle 304 is fitted to the point cloud existing in the grid A to determine a position and orientation of the virtual vehicle 304 in the grid. At this time, methods such as RANSAC, PROSAC, Iterative Closest Point, and principal component analysis can be considered as a fitting method. Subsequently, in a case of assuming that the virtual vehicle 304 is at the center of the grid A, the virtual vehicle 304 is similarly fitted to the adjacent straddling grid to determine the position and orientation of the virtual vehicle 304.

At this time, in a case where the difference between the position and orientation of each straddling grid and the position and orientation of the center grid is smaller than a predetermined threshold, each area that is straddled with the grid A is set as a travelable area (FIG. 4). FIG. 4 is a diagram illustrating an example of the principle of extracting the travelable area.

On the other hand, in a case where the difference between the position and orientation of each straddling grid and the position and orientation of the center grid is larger than the predetermined threshold, each area that is straddled with the grid A is set as a non-travelable area (FIG. 5). FIG. 5 is a diagram illustrating an example of the principle of extracting the travelable area.

Subsequently, a task of searching for another grid is repeated. In a case where it is determined that the grid which is once determined to be the travelable area is the non-travelable area based on the determination when another grid is centered, it is determined that that area is a boundary area. Similarly, even in a case where it is determined that the grid which is once determined to be the non-travelable area is the travelable area based on a search when another grid is centered, it is determined that it is a boundary area (FIG. 6). FIG. 6 is a diagram illustrating an example of the principle of extracting the travelable area.

FIG. 7 is a diagram illustrating an example of the principle of extracting the travelable area. By repeating the process in this manner, it is possible to finally obtain the area information classified into the three types of the travelable area, the non-travelable area, and the boundary area as illustrated in FIG. 7.

Subsequently, the area category determination unit 103 of FIG. 1 determines the category of the area. In Example 1, an example of classifying roads and squares will be described. An operation of the area category determination unit 103 will be described. The area category determination unit 103 determines that the area determined to be the travelable area is an area classified into categories such as a road and a square. In other words, the area category determination unit determines category information whether the travelable area is a road or another area.

FIG. 8 is a diagram illustrating an example of the operation of the area category determination unit 103. In the example, the category of the grid A is obtained by searching for the nearest boundary area in the eight directions of the grid A, and using each length as the feature amount. For example, the boundary areas are searched for the grid A in an upper, lower, right, left, right diagonally upward, left diagonally downward, left diagonally upward, right diagonally downward direction. Each length found is respectively added to the upper direction and the lower direction, the right direction and the left direction, the right diagonally upward direction and the left diagonally downward direction, the left diagonally upward direction and the left diagonally downward direction, and these lengths are used as a feature for category determination.

As an example, it can be classified based on the size such as if the shortest length among these is a certain threshold or less, it is classified as a road, and if the shortest length is longer than a certain threshold, it is classified as a square. This is searched for all the grids in the travelable area, and the category is discriminated. In the example, the nearest boundary area in 8 directions is searched, but the number of patterns to be searched can be changed according to the situation. In addition, the area category determination unit 103 has a method of discriminating the category of the travelable area, by learning the shape of the traveling area and the color of the traveling area as a feature by machine learning, in addition to the distance to the nearest boundary area in each direction.

Subsequently, an operation of the complementary portion determination unit 104 will be described. The complementary portion determination unit 104 determines a complementary measurement portion having a possibility of being hidden from the travelable area and the category information.

FIG. 9 illustrates the result in a case where the area category discrimination 103 is performed in the environment having a tunnel serving as an example of a portion where route information is insufficient due to interruption of the tunnel or trees. Information that causes route information to be insufficient is referred to as the square. A road 901 and the road 901 in FIG. 9 are connected through a tunnel 903. However, in a case of three-dimensional measurement using aerial images, an inside of the tunnel 903 is in the blind spot, so that the road inside thereof cannot be measured. As a result, the road 901 and the road 902 are recognized as separate roads.

However, in a case where the complementary portion determination unit 104 detects the end of the road area, using a prior knowledge that it is generally unnatural that the road is cut off in the middle without connecting to any area, it is determined that there is an unmeasured area around a vicinity, and the vicinity of the ends of the road 901 and the road 902 is determined as a complementary portion. That is, in a case where the category of the travelable area includes the road and the square, the complementary portion determination unit 104 determines that the end of the road is a complementary portion in a case where the end of the road is not connected to the square.

FIG. 10 is an example of a portion where route information is insufficient due to a temporary stop of a vehicle or a gate which opens and closes. Subsequently, in the case illustrated in FIG. 10, although a road 1001 and a square 1002 are actually connected to each other on a road 1003, since the vehicle 1003 blocks the road 1003 connecting the road 1001 and the square 1002, the road is not detected.

Therefore, in the complementary portion determination unit 104, it is determined that the situation in which the square 1002 is not connected to another area and is isolated is abnormal, and it is determined that the vicinity of the square 1002 is the complementary portion. That is, in a case where the category of the travelable area includes the road and the square, the complementary portion determination unit 104 determines the boundary portion of the travelable area of the area determined as the square to be the complementary portion, in a case where any one of the area determined by the area category determination unit 103 to be the square is not connected to the road.

In a case where the complementary portion is determined, the complementary portion presentation unit 105 presents the complementary portion to the user. FIG. 11 is a diagram illustrating an example of the complementary portion presentation unit. FIG. 11 illustrates an example in which the complementary portion is displayed using a display 1101 as an example.

In the example of FIG. 11, the complementary portion determined by the complementary portion determination unit 105 is indicated by circles, arrows, and characters. In this case, in addition to the display 1101, means for displaying may be any means by which the image can be displayed, such as tablet terminals, smart phones, projectors, and the like. In addition, as a method of displaying the complementary portion, in addition to a method of illustrating the complementary portion by the circle, a method of highlighting, changing the color, or displaying the coordinate position may be considered.

According to the Example, when the environment is measured by the UAV or the like, in a case where the occlusion is generated in the environment due to the interruption of the tunnel or trees, and even in a case where the road is temporarily blocked during measurement due to a temporary stop of a vehicle or a gate, it is possible to specify the potential portion and present the potential portion to the user. In addition, it is possible to present the user a portion (complementary measurement portion) where there is a possibility that sufficient environmental information is not obtained when the autonomous traveling vehicle is traveled, from the three-dimensional shape information created using the information acquired using UAV and the like. The user measures again with the sensor attached to the UHV and the sensor attached to the vehicle based on this information, so that it is possible to create an environmental map required for the autonomous traveling vehicle to travel autonomously.

Example 2

In creating an environmental map where an autonomous traveling vehicle or the like can be used, the present example is an example of presenting a complementary measurement portion serving as a portion where there is a possibility that information is insufficient to the user, measuring a measurement data for the presented portion with a measuring vehicle, and integrating the measurement data with the previously created environmental map to update the map.

FIG. 12 is a schematic diagram illustrating a configuration according to this Example. The position information of the complementary portion is supplied to a complementary portion measurement unit 1201 so as to measure with the measuring vehicle with respect to the complementary portion presented by the complementary measurement portion presentation unit 105 in Example 1. An environment map automatic creation device 1000 is provided with the complementary portion measurement unit 1201, a complementary three-dimensional shape information storage unit 1202, a measurement information integration unit 1203, and a map updating unit 1204.

The complementary portion measurement unit 1201 measures the complementary portion presented by the complementary measurement portion presentation unit 105 in accordance with the instruction. At this time, the measuring means used by the complementary portion measurement unit 1201 is a measuring vehicle equipped with a camera, a LIDAR, millimeter wave radar, ultrasonic sensor, and an external sensor similar thereto, which can acquire the shape of the environment or brightness, color information, and temperature information of the environment, or an external sensor that can be carried by hand. The measuring vehicle may be a manned vehicle or an unmanned vehicle.

The three-dimensional shape information of the complementary portion measured by the complementary portion measurement unit 1201 is stored in a complementary three-dimensional shape information storage unit 1202.

Subsequently, the measurement information integration unit 1203 integrates (matches) the three-dimensional shape information stored in a complementary three-dimensional shape information storage unit 1202 and the three-dimensional shape information of the map stored in the three-dimensional information storage unit. At this time, matching using the Iterative Closest Point method or a matching method using a robust estimation method such as RANSAC and PROSAC can be considered as a method of integrating the three-dimensional shape information of both.

The three-dimensional shape information matched and integrated by the measurement information integration unit 1203 is adopted as new map data by the map updating unit 1204. In other words, the map updating unit 1204 updates the environmental map based on the three-dimensional shape information matched by the measurement information integration unit 1203. At this time, in a case where there is a discrepancy between the three-dimensional shape information newly measured by the complementary portion measurement unit 1201 and the data stored in the three-dimensional shape information storage unit, the information of the complementary portion measurement unit is preferentially reflected. As a method of integrating the map information at this time, a method using an occupied lattice map can be considered.

REFERENCE SIGNS LIST

1 UAV,
2 Monocular camera,
11 Sensor data storage unit,
12 Three-dimensional point cloud generation unit,
13 Surface generation unit,
14 Three-dimensional shape information storage unit,
102 Travelable area extraction unit,
103 Area category determination unit,
104 Complementary portion determination unit,
105 Complementary portion presentation unit,
301 Road surface area,
302 Obstacle,
303 Obstacle,
304 Virtual vehicle,
901 Road,
902 Road,
903 Tunnel,
1000 Environment map automatic creation device,
1001 Road,
1002 Square,
1003 Road,
1004 Vehicle,
1101 Display,
1102 Road,
1103 Road,
1104 Tunnel,
1201 Complementary portion measurement unit,
1202 Complementary three-dimensional shape information storage unit,
1203 Measurement information integration unit,
1204 Map updating unit

The invention claimed is:

1. An environment map automatic creation device comprising:
    a travelable area extraction unit that acquires three-dimensional shape information of an area, which is acquired by a sensor in a flying object, determines one or more obstacles within the area based on the three-dimensional shape information, determines a travelable area devoid of the determined one or more obstacles and generates an environmental map;
    an area category determination unit that determines a category of a portion of the travelable area among a plurality of categories including a category indicating there is insufficient three-dimensional shape information for a respective portion of the travelable area;
    a complementary portion determination unit that determines there is a complementary portion within the area which complements the travelable area based on portions of the travelable area and the category of the portions of the travelable area indicating there is insufficient three-dimensional shape information; and
    a complementary measurement portion presentation unit that displays the complementary measurement portion on a display.

2. The environment map automatic creation device according to claim 1,
    wherein the area category determination unit determines a category of the travelable area based on a shape of the traveling area.

3. The environment map automatic creation device according to claim 1,
wherein the area category determination unit determines a category of the travelable area based on a color of the traveling area.

4. The environment map automatic creation device according to claim 1,
wherein the category of the travelable area include a road and a square, and
wherein upon determining an end of the road is not connected to the square, the complementary portion determination unit determines that the complementary portion includes at least a portion of the end of the road.

5. The environment map automatic creation device according to claim 1,
wherein the road and the square are included in the category of the travelable area, and
in a case where any one of the areas determined by the area category determination unit as the square is not connected to the road, the complementary portion determination unit determines a boundary portion of the travelable area of the area determined as the square to be the complementary portion.

6. The environment map automatic creation device according to claim 1,
wherein the complementary portion is measured by an unmanned vehicle.

7. The environment map automatic creation device according to claim 1, further comprising:
a complementary three-dimensional shape information storage unit that stores complementary three-dimensional shape information serving as the three-dimensional shape information of the complementary portion;
a measurement information integration unit that matches the complementary three-dimensional shape information and the three-dimensional shape information; and
a map updating unit that updates the environmental map based on the three-dimensional shape information matched by the measurement information integration unit.

* * * * *